(12) United States Patent
Agarwal et al.

(10) Patent No.: US 8,391,883 B2
(45) Date of Patent: Mar. 5, 2013

(54) INTELLIGENT LOCATION TRACKING BASED ON PREDICTIVE MODELLING

(75) Inventors: Salil Agarwal, Bangalore (IN); Niranjana Mallikarjunappa, Bangalore (IN); Praveen Sangam, Tumkur (IN)

(73) Assignee: Nokia Siemens Networks GmbH & Co. KG, München (DE)

( * ) Notice: Subject to any disclaimer, the term of this patent is extended or adjusted under 35 U.S.C. 154(b) by 459 days.

(21) Appl. No.: 12/311,343

(22) PCT Filed: Sep. 19, 2007

(86) PCT No.: PCT/EP2007/059877
§ 371 (c)(1),
(2), (4) Date: Sep. 29, 2009

(87) PCT Pub. No.: WO2008/037638
PCT Pub. Date: Apr. 3, 2008

(65) Prior Publication Data
US 2010/0062789 A1 Mar. 11, 2010

(30) Foreign Application Priority Data
Sep. 27, 2006 (IN) .............................. 991/KOL/2006

(51) Int. Cl.
*H04W 24/00* (2009.01)
(52) U.S. Cl. .................................. 455/456.1; 455/546.3
(58) Field of Classification Search .... 455/456.1–456.6, 455/418–420, 414.1, 457, 422.1
See application file for complete search history.

(56) References Cited

U.S. PATENT DOCUMENTS

| | | | |
|---|---|---|---|
| 5,390,234 A | 2/1995 | Bar-Noy et al. | |
| 6,119,006 A * | 9/2000 | Shaffer et al. | 455/440 |
| 6,421,009 B2 | 7/2002 | Suprunov | |
| 6,747,961 B1 * | 6/2004 | Ahmed et al. | 370/328 |
| 6,859,653 B1 * | 2/2005 | Ayoub et al. | 455/435.2 |
| 7,149,504 B1 * | 12/2006 | Weaver et al. | 455/414.2 |
| 7,242,950 B2 * | 7/2007 | Suryanarayana et al. | 455/456.5 |
| 7,254,127 B2 * | 8/2007 | Evensen | 370/352 |
| 7,844,283 B2 * | 11/2010 | Riise et al. | 455/456.3 |
| 2002/0155844 A1 | 10/2002 | Rankin | |
| 2005/0003835 A1 | 1/2005 | Riise et al. | |
| 2006/0025160 A1 * | 2/2006 | Kodali et al. | 455/456.5 |

FOREIGN PATENT DOCUMENTS

| | | |
|---|---|---|
| GB | 2402841 | 12/2004 |
| WO | WO 03085936 | 10/2003 |
| WO | 2004/016027 A1 | 2/2004 |

OTHER PUBLICATIONS

3 GPP TS 29.002 V7.4.0, "3rd Generation Partnership Project; Technical Specification Group Core Network and Terminals; Mobile Application Part (MAP) Specification; (Release 7)", Jun. 2006, pp. 1-1280.

* cited by examiner

*Primary Examiner* — Brandon Miller
(74) *Attorney, Agent, or Firm* — Squire Sanders (US) LLP

(57) ABSTRACT

Tracking a mobile station, MS, (108) of a telecommunications network including a LCS client (102), Location services client, for a GMLC, Gateway Mobile Location Center, (104). The GMLC (104) checking a prediction database to find a predicted location area of the MS. If the prediction data is valid then location estimation procedure will not be started, the GMLC (104) requesting an MSC 106 to forward the location update information to the GMLC (104) for the MS (108). In case an location area update is done before an end of a prediction period and the MS (108) moves out of the predicted area then an location estimation procedure will be started for the MS (108).

12 Claims, 2 Drawing Sheets

100

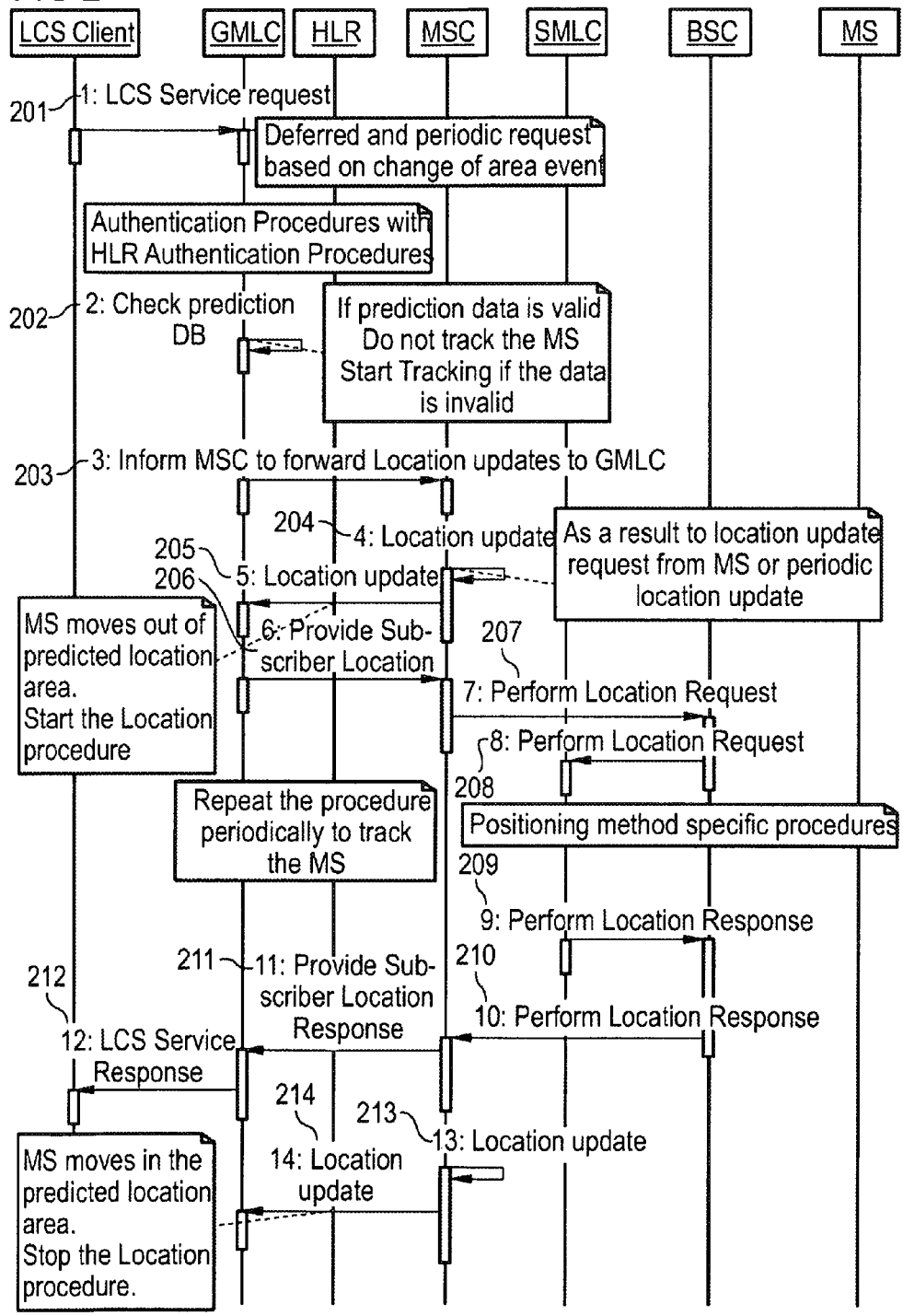

INTELLIGENT LOCATION TRACKING BASED ON PREDICTIVE MODELLING

Currently large network traffic is generated as result of certain location-based applications, which require continuous polling of a target (MS) Mobile Station. These applications trigger an action, for example, providing position information, when the target MS reaches a pre-determined location. The problem is that large network traffic is generated in order to periodically check whether the target MS is available in the target area of the application.

With a variety of location based services being offered, which need continuous polling of the target MS to trigger some action, the network traffic increases without much revenue being generated for the network operator. There is a real need to solve this problem. A reduction in avoidable traffic makes the network free to handle more revenue-generating traffic, hence increasing the earnings for operators.

Various prior art solutions to the problem exist. In one solution the target MS is polled periodically and it is checked whether the target MS is in a target area. However, this prior art solution leads to increased network traffic, with no revenue generation, leading to congestion.

In another solution, PCT patent application No. WO2004016027 a method of reducing the network traffic is described based on a last known location of an MS as compared to a threshold time limit until a time the last known location of the MS is considered valid, in case the MS is inactive.

However, patent application No. WO2004016027 deals with the location of MS which is not in an active state. If the MS is active then the normal flow of location determination is initiated. This does not save any network traffic at all.

Furthermore, WO2004016027 discloses storing the last known location of an MS and using it until a threshold time expires. This leads to a situation when MS has changed location within the threshold time, then an incorrect location of the MS will be reported.

WO2004016027 also describes storing the last known location of the MS in a database and administering the threshold time by operator action. This document does not deal with any predictive database nor how to form this database.

The present solutions aims at reducing network traffic generated by continuous location polling for an MS (Mobile Station) for location services which relies on polling/tracking target MS periodically to obtain a location estimate.

The invention solves the problems above by maintaining a prediction database for each target MS based on time intervals. The database may contain data related to time, and location area where the MS would probably be located. During this time period the MS is not polled for location.

The database may be created offline by the operator manually. In another variant, the database may be created online with the aide of software, which monitors movements of all MSs that subscribe to this service and creates the database automatically, based on patterns observed over a long term for each such MS.

In case the target MS moves out of the predicted location, the network may detect this situation by using network induced location update messages and polling for the MS starts again.

During the period if the MS re-enters the predicted location the tracking may be stopped for the target MS.

If prediction data is not available for a given time then the MS may be polled regularly until such data is available again for some predetermined period.

The prediction data can for example be maintained in an existing network node like GMLC (Gateway Mobile Location Centre) or can be created in a separate IN (Intelligent Network) node providing this service.

The predictive database could be created manually by getting information from customers about their usage pattern over a week. Another way is to create the database online by software, which monitors movements of the MS that subscribes to this service. This database can be created based on patterns observed over a period for each such MS.

The following data, for example, may be stored in the prediction database in the network. Probable candidates would be GMLC, intelligent node or HLR—Home Location Register.

MS Identification (For the MSs which subscriber to the tracking application)

MS profile indicating the time duration for which the location of MS is available Predicted location area information In one embodiment, the location update message described in the scenario when the MS moves out of the predicted area/cell is a MAP_UPDATE_LOCATION message. This is a network induced message described in 3GPP standard 29.002 7.4.0 section 8.1.2. This message may be forwarded to a GMLC from an MSC if the MS which subscribes to this service has moved out of the relevant area.

This location update message is distinct from the polling message. The GMLC decides if polling shall be started or not based on this location update message.

The invention aims to:
1. Create a predictive database for all target MSs that subscribe to polling application services.
2. Avoid polling of an MS based on information from a predictive database even for active MSs.
3. Override prediction information based on location area information, that is the location of the MS is provided correctly in all situations when the MS is active. If the MS moves out of the predicted area, such a condition is detected and the prediction database is not used and a location request is triggered instead. Also when the MS comes back into the predicted area, the location information is again taken from the prediction database.

Some advantages/benefits of the proposed solution are listed below:

A reduction in network traffic due to reduced polling even for MSs which are active.

Accurate location of an MS is provided even if the MS moves out of the predicted area.

Cost saving for an operator due to reduced network traffic.

In one embodiment, the invention involves the following features:
1. Using a predictive database to start and stop periodic polling of a target MS.
2. Detection of movement of a target MS out of or into the predicted area (by mean of location update messages from the network) to override or resume usage of the predictive database.
3. Online and offline creation of predictive database based on a pattern of an MS subscriber's usage.

An embodiment of the invention will now be described, by way of example only, with reference to the accompanying drawings in which:

FIG. 2 illustrates the message flow for starting and stopping a location estimation procedure of the present invention.

FIG. 1 shows a BSS (Base Station Subsystem) 100 based solution for LCS (Location Services) in a GSM network. However, the invention may be applied to other LCS implementations.

Figure 1:
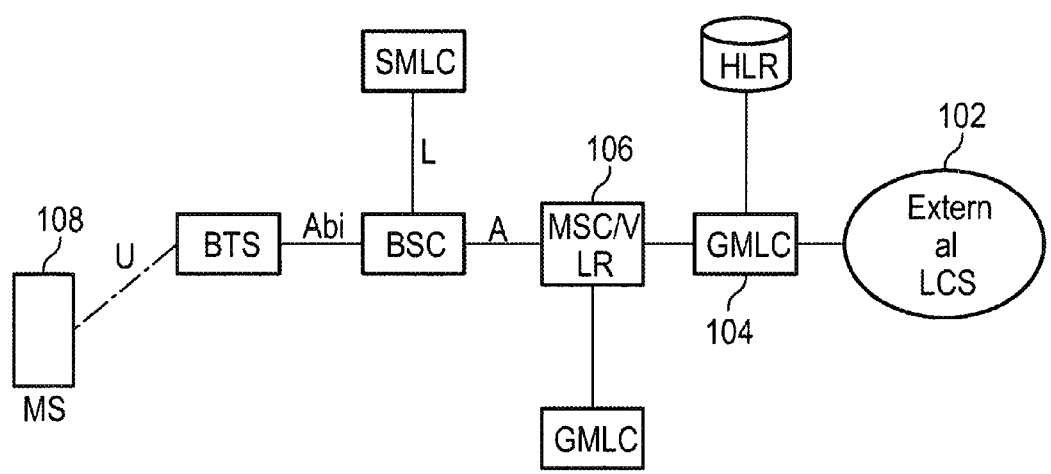
FIG. 1 illustrates a BSS based LCS in a GSM network according to the invention.

An LCS client 102 (Location services client) providing this service sends a deferred and periodic location query to track a target MS 108 to a GMLC (Gateway Mobile Location Centre) 104.

The GMLC 104 checks a prediction database, which for example is located in its associated HLR, to find a predicted location area of the target MS 108.

If prediction data contained in the prediction database is valid then a location estimation procedure will not be started.

The GMLC 104 requests an MSC (Mobile Switching Centre) 106 to forward the location update information to the GMLC 104 for the target MS 108.

In case that a location area update is done before the end of the prediction period and the target MS 108 moves out of the predicted area then a location estimation procedure will be started for the target MS 108.

This procedure will be periodically executed and results in a return of the location estimate of the target MS 108 to the LCS client 102.

If the MS 108 re-enters the predicted location area in the prediction period then the location estimation procedure will be stopped.

FIG. 2 illustrates the message flow for starting and stopping the location estimation procedure.

In step 201, the LCS Client 102 requests a deferred and periodic location request for the target MS 108 based on a change of area event to the GMLC. This results in the authentication and authorization steps as recommended by 3GPP.

In step 202, the GMLC checks in the prediction database regarding the location of the target MS.

In step 203, if the prediction data and time period are valid it informs the service MSC 106 to forward any location updates for that MS to the GMLC.

In step 204, the Service MSC 106 receives a location update message for the target MS 108.

In step 205, the MSC 106 forwards the location update details to the GMLC. [Condition: MS has moved out of the predicted location.]

In step 206, the GMLC triggers a location request for the target MS 108 to the MSC 106.

In step 207, the MSC forwards the location request to a BSC (Base Station Controller).

In step 208, the BSC forwards the location request to a SMLC (Serving Mobile Location Centre)

In step 209, the SMLC returns the current location response of the target MS to the BSC.

In step 210, the BSC forwards the response to the MSC.

In step 211, the MSC forwards the response to the GMLC.

In step 212, the GMLC returns location response to the LCS Client 102.

In step 213, the MSC receives a location update for the target MS 108.

In step 214, the MSC forwards the location update details to the GMLC. [Condition: MS has moved into the predicted location.]

In step 215, the GMLC stops further location requests for the target MS 108 to track it.

In an alternative to step 202, if the prediction time period is not valid, the GMLC starts tracking of the target MS immediately until the time valid prediction data is available.

An example will now be given with reference to FIG. 2 that provides a particular application of an implementation of the invention.

Prediction data for a particular target MS is not available from 8:00 AM to 9:00 AM and but is available for 9:00 AM to 6:00 PM as location id=A.

Then the target MS will be polled continually from 8:00 AM to 9:00 AM as usual.

If the target MS reaches location id=A at 9:00 AM then polling will stop at this time until 6:00 PM.

Polling will however be triggered again if the target MS moves out of location id=A between 9:00 AM and 6:00 PM. This situation is detected based on location update information of the target MS.

If the target MS moves out of location id=A, say, at 11:00 AM, then continual polling will start at 11:00 AM.

Now, if the target MS re-enters the predicted area at 2:00 PM then, according to the invention, this situation will be detected by use of the location update message and further polling will be stopped until the target MS moves out again or until 6:00 PM, that is the time up to which the predicted data is valid.

The invention claimed is:

1. A method for tracking a mobile station of a telecommunications network, comprising the steps of:
    checking prediction data in a prediction database to find a predicted location area of the mobile station;
    if the prediction data indicates a location of the mobile station that is valid, not triggering a first location estimation procedure, and if the prediction data indicates a location of the mobile station that is not valid, triggering the first location estimation procedure by requesting a mobile switching center to forward location area update information to a gateway mobile location center for the mobile station; and
    in the event that a location area update is received before the end of a prediction period which indicates that the mobile station has moved out of the predicted location area, triggering a second location estimation procedure for the mobile station subsequent to the first location estimation procedure, to track the mobile station while it is outside the predicted location area.

2. The method of claim 1 characterized in that, periodically executing the foregoing steps and returning a location estimate of the mobile station to a location services client.

3. The method of claim 1 characterized in that in the event that the mobile station re-enters the predicted location area in the prediction period the location estimation procedure will be stopped.

4. The method of claim 1 characterized in that checking prediction data in a prediction database to find a predicted location area of the mobile station is carried out by the gateway mobile location center.

5. The method of claim 1 characterized in that requesting a mobile switching center to forward location area update information to the gateway mobile location center for the mobile station is carried out by the gateway mobile location center.

6. A telecommunications network for tracking a mobile station comprising a gateway mobile services center, a prediction database, and a mobile switching center, the gateway mobile services center configured for:
    checking prediction data in the prediction database to find a predicted location area of the mobile station; and
    requesting the mobile switching center to forward location area update information to a gateway mobile location center for the mobile station, and
    the network configured for not triggering a first location estimation procedure if the prediction data indicates a location of the mobile station that is valid, and if the prediction data indicates a location of the mobile station that is not valid, triggering the first location estimation procedure by requesting the mobile switching center to forward location area update information to the gateway mobile location center for the mobile station; and triggering a second location estimation procedure for the mobile station subsequent to the first location estimation procedure in the event that a location area update is received before the end of a prediction period which indicates that the mobile station has moved out of the predicted location area.

7. A network node for controlling tracking of a mobile station, the network node configured for:
checking prediction data in a prediction database to find a predicted location area of the mobile station;
requesting a mobile switching center to forward location area update information to the network node for the mobile station;
not triggering a first location estimation procedure if the prediction data indicates a location of the mobile station that is valid, and if the prediction data indicates a location of the mobile station that is not valid, triggering the first location estimation procedure by requesting the mobile switching center to forward location area update information to the gateway mobile location center for the mobile station; and triggering a second location estimation procedure for the mobile station subsequent to the first location estimation procedure, in the event that a location area update is received before the end of a prediction period which indicates that the mobile station has moved out of the predicted location area.

8. The network node of claim 7 characterized in that it comprises a gateway mobile location center.

9. The network node of claim 7 characterized in that it comprises an intelligent network node.

10. The network node of claim 7 characterized in that it comprises the prediction database.

11. The network node of claim 7 characterized in that it checks prediction data in the prediction database which is located in a home location register.

12. A prediction database for containing checkable prediction data to enable a network node to control the tracking mode of a mobile station, the prediction database configured for:
allowing the network node to check the prediction data to find a predicted location area of the mobile station, the network node being adapted to not trigger a first location estimation procedure if the prediction data indicates a location of the mobile station that is valid, and being adapted to trigger the first location estimation procedure by requesting a mobile switching center to forward location area update information to the network node for the mobile station if the prediction data indicates a location of the mobile station that is not valid, and
in the event that a location area update is received before the end of a prediction period which indicates that the mobile station has moved out of the predicted location area, the network node is adapted to trigger a second location estimation procedure for the mobile station subsequent to the first location estimation procedure, to track the mobile station while it is outside the predicted location area.

* * * * *